US012089132B2

(12) United States Patent
Ben Hamozeg et al.

(10) Patent No.: US 12,089,132 B2
(45) Date of Patent: Sep. 10, 2024

(54) SYSTEM AND METHOD OF OPTIMIZING COMMUNICATION IN AN IOT MESH NETWORK

(71) Applicant: AGRINT SENSING SOLUTIONS LTD., Hod HaSharon (IL)

(72) Inventors: Yehonatan Ben Hamozeg, Rosh Haayin (IL); Yossef Simoni, Hertzeliya (IL); Tal Yechye, Tel Aviv (IL)

(73) Assignee: AGRINT SENSING SOLUTIONS LTD., Hod Hasharon (IL)

( * ) Notice: Subject to any disclaimer, the term of this patent is extended or adjusted under 35 U.S.C. 154(b) by 69 days.

(21) Appl. No.: 17/412,302

(22) Filed: Aug. 26, 2021

(65) Prior Publication Data

US 2023/0065085 A1    Mar. 2, 2023

(51) Int. Cl.
*H04W 40/12* (2009.01)
*H04B 17/318* (2015.01)
*H04W 4/38* (2018.01)

(52) U.S. Cl.
CPC .......... *H04W 40/12* (2013.01); *H04B 17/318* (2015.01); *H04W 4/38* (2018.02)

(58) Field of Classification Search
CPC ..... H04W 84/18; H04W 24/02; H04W 24/04; H04W 28/021; H04W 16/18
See application file for complete search history.

(56) References Cited

U.S. PATENT DOCUMENTS

| 9,992,808 | B2 | 6/2018 | Chau |
| 2007/0280137 | A1 | 12/2007 | Bahr et al. |
| 2016/0029403 | A1 | 1/2016 | Roy et al. |
| 2016/0261458 | A1* | 9/2016 | Huang ................ H04L 43/0817 |
| 2017/0099218 | A1 | 4/2017 | Holcombe et al. |
| 2017/0230784 | A1 | 8/2017 | Kwon et al. |
| 2022/0159564 | A1 | 5/2022 | Peng et al. |

FOREIGN PATENT DOCUMENTS

| CN | 111132113 | | 5/2020 |
| CN | 112155518 A | * | 1/2021 |
| JP | 2016021720 A | * | 2/2016 |
| KR | 102098156 | | 4/2020 |
| WO | WO 2020/227429 | | 11/2020 |

OTHER PUBLICATIONS

"Context-aware Sensor Search, Selection and Ranking Model for Internet of Things Middleware", Charith Perera et al. (Year: 2013).*
International Search Report for PCT Application No. PCT/IL2022/050928, mailed on Dec. 19, 2022.

* cited by examiner

*Primary Examiner* — Khalid W Shaheed
(74) *Attorney, Agent, or Firm* — PEARL COHEN ZEDEK LATZER BARATZ LLP

(57) ABSTRACT

A communication system and method, including: a hub, and a plurality of sensors, where each sensor is configured to transmit communications to the hub, where each sensor is configured to assign itself an index number based on signal quality of communication with adjacent sensors, such that sensors with highest communication signal quality with the adjacent sensors are assigned the lowest index number, and where communication is facilitated in a communication order that is determined based on the assigned index numbers.

11 Claims, 4 Drawing Sheets

SYSTEM AND METHOD OF OPTIMIZING COMMUNICATION IN AN IOT MESH NETWORK

FIELD OF THE INVENTION

The present invention relates to communication between computing devices. More particularly, the present invention relates to systems and methods for optimizing communication in an Internet of Things (IoT) mesh network.

BACKGROUND

Communication between computing devices, for instance via Bluetooth, usually involve pairing of devices and sharing of data. For examples, Internet of Things (IoT) devices communicate via a wireless network (e.g., cellular, Wi-Fi, Bluetooth, etc.) in order to share information with a central server and/or switch and/or hub.

When a large number of communicating computing devices is required, for instance in an array of mobile IoT sensors, the communication can be substantially limited due to power consumption of the battery of each device, as well as limited due to limited processing resources of the network.

Therefore, it can be desirable to allow a large number of communicating computing devices to communicate over a large area for a longer period of time.

SUMMARY

There is thus provided, in accordance with some embodiments of the invention, a communication system, including: a hub, and a plurality of sensors, where each sensor is configured to transmit communications to the hub, where each sensor is configured to assign itself an index number based on signal quality of communication with adjacent sensors, such that sensors with highest communication signal quality with the adjacent sensors are assigned the lowest index number, and where communication is facilitated in a communication order that is determined based on the assigned index numbers.

In some embodiments, the communication between sensors is carried out via Bluetooth. In some embodiments, each sensor is assigned an index number such that the shortest path to communication with the hub is achieved. In some embodiments, the shortest path has lowest number of intermediate nodes during communication. In some embodiments, the system includes two hubs, where one of the hubs is configured to be a backup for the other hub. In some embodiments, at least one sensor is an Internet of Things (IoT) sensor.

There is thus provided, in accordance with some embodiments of the invention, a method of communication for a plurality of sensors, including: receiving, by each sensor of the plurality of sensors, a signal quality for communication with adjacent sensors, assigning, by each sensor, an index number based on the received signal quality, such that sensors with highest communication signal quality are assigned the lowest index number, and facilitating communication between the plurality of sensors and a hub in a communication order that is determined based on the assigned index numbers. In some embodiments, the hub is configured to receive communications from each of the sensors.

In some embodiments, each sensor is assigned an index number such that the shortest path to communication with the hub is achieved. In some embodiments, the shortest path has lowest number of intermediate nodes during communication. In some embodiments, communication is facilitated between the sensors to two hubs, where each hub is configured to receive communications from each of the sensors, where the communication order that is determined based on the assigned index numbers, and where one of the hubs is configured to be a backup for the other hub. In some embodiments, the communication between sensors is carried out via Bluetooth. In some embodiments, at least one sensor is an Internet of Things (IoT) sensor.

There is thus provided, in accordance with some embodiments of the invention, a communication system for communication between a plurality of Internet of Things (IoT) devices, including: a hub, and a plurality of IoT devices, where each IoT device is configured to transmit communications to the hub, where each IoT device is configured to assign itself an index number based on signal quality of communication with adjacent IoT devices, such that IoT devices with highest communication signal quality are assigned the lowest index number, and where communication is facilitated in a communication order that is determined based on the assigned index numbers.

In some embodiments, the communication between IoT devices is carried out via Bluetooth. In some embodiments, each IoT device is assigned an index number such that the shortest path to communication with the hub is achieved. In some embodiments, the shortest path has lowest number of intermediate nodes during communication. In some embodiments, the system includes two hubs, where one of the hubs is configured to be a backup for the other hub.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
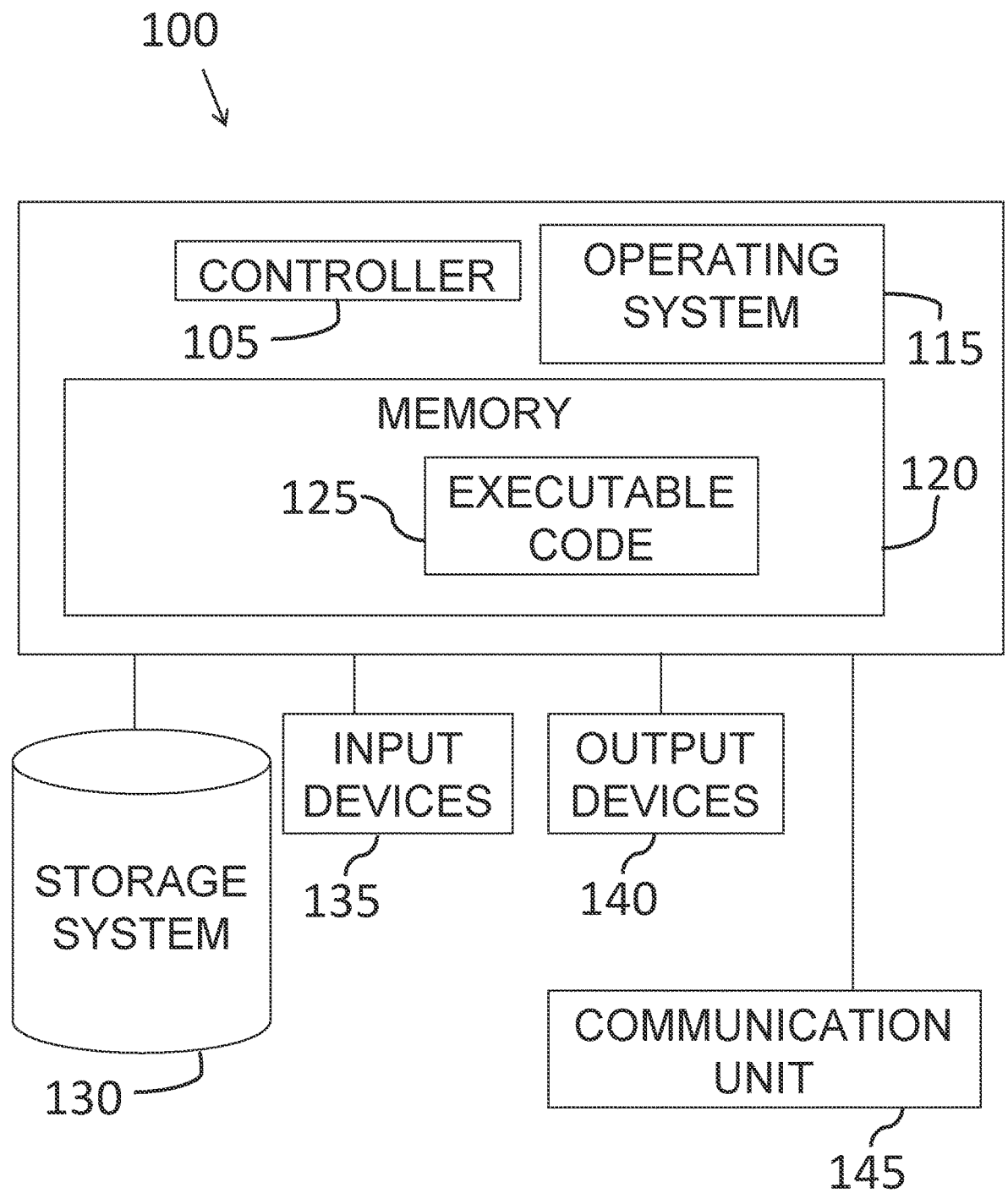
FIG. 1 shows a block diagram of a computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet, Controller 105 may be configured to execute program code to perform operations described herein. The system described herein may include one or more computing device(s) 100, for example, to act as the various devices or the components shown in FIG. 2A. For example, communication system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (i/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, hut is not limited to, any type of disk including, semiconductor devices such as read-only memories (ROMs) and/or random-access memories (RAN/Is), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2A:
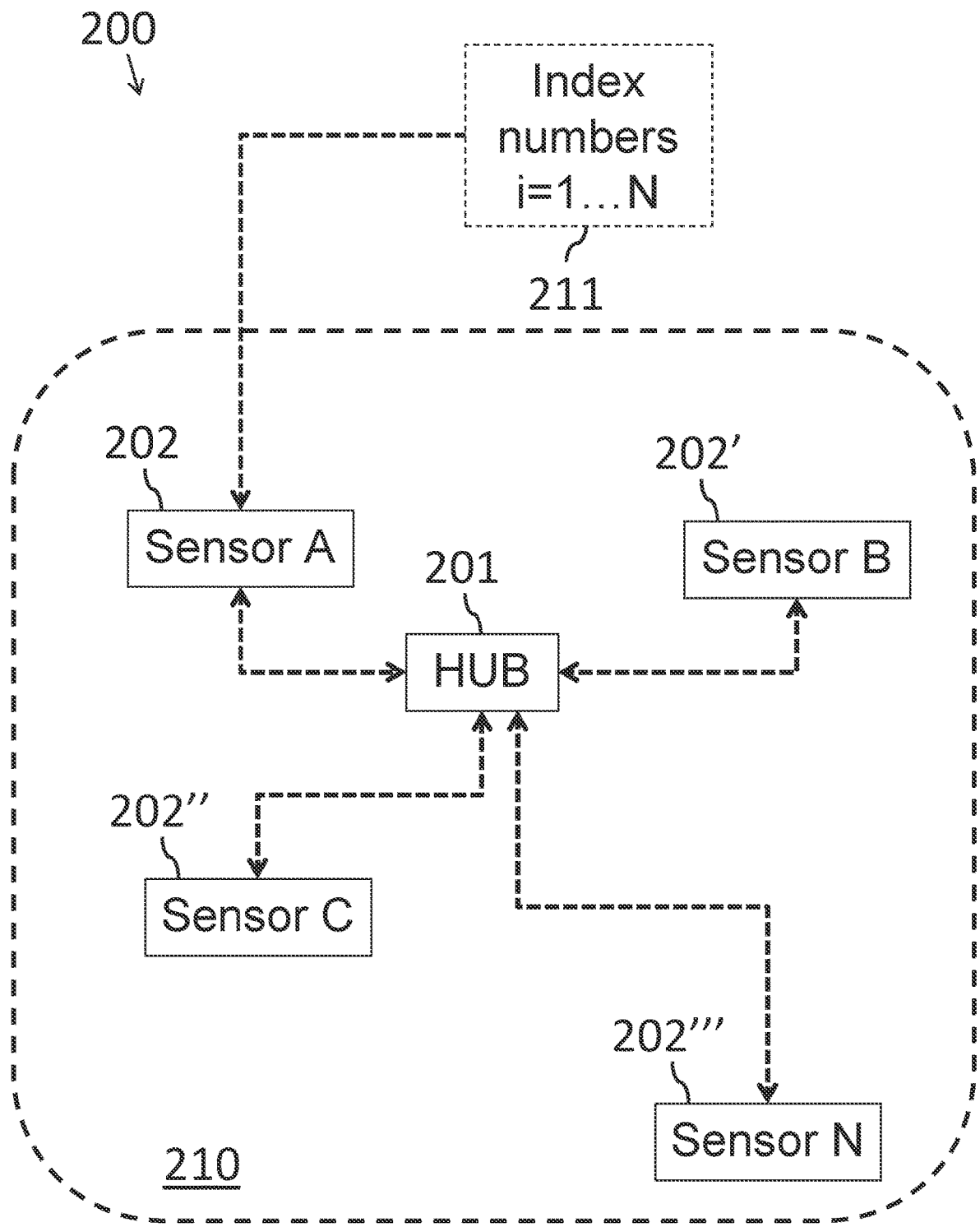
FIG. 2A shows a block diagram of a communication system, according to some embodiments of the invention.

Reference is now made to FIG. 2A, which shows a block diagram of a communication system 200, according to some embodiments of the invention. In FIG. 2A, hardware elements are indicated with a solid line and the direction of arrows indicate a direction of information flow between the hardware elements.

The communication system 200 includes Hub 201, and a sensor A 202, a sensor B 202', a sensor C 202" and a sensor N 202''', generally sensors 202. Hub 201 can be coupled to and in communication with sensor A 202, sensor B 202', sensor C 202", and sensor N 202'''. The coupling and/or communication can be wired or wireless.

The communication system 200 may include a computer network or a mesh network 210 of computing devices (such as computing device 100, shown in FIG. 1). The computer network 210 may be for instance a mesh network of sensors and/or Internet of Things (IoT) devices.

In some embodiments, the computer network 210 includes a hub 201 and a plurality of sensors 202 (e.g., IoT devices), for example sensors attached to trees to detect insects.

In various embodiments, the huh 201 is replaced with a switch or router, or can be any combination of a hub, switch and router. The hub 201 may receive communications from the sensors 202, coupled thereto, and transfer the received data to a destination external to the computer network 210 of the communication system 200. Each sensor 202 can communicate with the hub 201, for example via wired and/or wireless communication such as Wi-Fi, cellular, and/or Bluetooth. In some embodiments, a sensor 202''' that is located far away from the hub 201, with at least one other sensor 202' closer to the hub 201, may pass or transmit information to the hub 201 via the at least one other sensor 202', as further described hereinafter.

In some embodiments, the communication in communication system 200 is carried out via Bluetooth Low Energy (BLE) in order to reduce the required amount of power to facilitate the communication. For example, sensors 202 of the computer network 210 may be mobile IoT sensors, where each IoT sensor is powered by a battery. The IoT sensors can be distributed in a field such that communication is required between the sensors in order to cover the entire field when some sensors cannot directly communicate with the hub 201 (e.g., due to a large distance).

In some embodiments, each sensor 202 includes a renewable energy power facility (e.g., a dedicated solar panel) and/or is connected to a wired power source.

In some embodiments, the sensors 202 communicate with the hub 201 via BLE in order to, for example, reduce power consumption, while the hub 201 receives all the data and is connected to external servers (e.g., connected to the Internet). In some embodiments, at least one sensor 202 is an Internet of Things (IoT) sensor. For example, the communication within the computer network 210 may be between drones, or autonomous cars that use intermediate nodes to pass information within the communication system 200. Thus, two distant nodes of the network that cannot communicate directly, use intermediate nodes of the mesh network in order to pass information, such as cars passing information along a traffic jam.

According to some embodiments, communication within the computer network 210 (e.g., a mesh network) is carried out via the BLE protocol, such that each node of the computer network 210 may be assigned an index number for determination of the communication order. For example, in order to save power, a sensor 202 that is distant from the hub 201 may pass the information to an adjacent sensor 202 that in turn may pass the information to the hub 201 such that long range communication can be avoided with minimal power consumption.

According to some embodiments, each sensor 202 assigns itself an index number i=1, 2, 3 . . . N based on signal quality, strength of communication with the huh 201, or any combination thereof. For example, the index number 211 may be assigned based on Received Signal Strength Indicator (RSSI) data for each sensor 202, where each sensor 202 assigns the index number 211 to itself in accordance with a predefined algorithm, in some embodiments, each sensor 202 assigns an index number for itself based on signal quality for communication with adjacent sensors 202. For example, the predefined algorithm allows communication topology to be carried out with "N−1" index numbers where a sensor with index number "3" communicates with an adjacent sensor with index number "2", that in turn communicates with the hub having index number "1".

In some embodiments, each sensor 202 receives an RSSI list with all (or substantially all) signal attributes of adjacent sensors 202, such that each sensor 202 assigns itself an index number in accordance with the communication signal strength of the adjacent sensors 202.

The hub 201 may be assigned a default index number "i=1", and adjacent sensors 202 with a highest signal quality for communication with the hub 201, may be assigned index number "i+1=2", such that each element of the computer network 210 communicates with another element having a lower index number 211. Sensors 202 that are located further away from the hub 201 and thus have a lower signal quality can be assigned a higher index number 211. In these examples, the shortest path to communication between the sensors 202 and the hub 201, for example the path being shortest in distance and/or having lowest number of intermediate nodes during communication, may be calculated based on the assigned index numbers 211. In some embodiments, the communication topology (or order) is determined based on the assigned index numbers 211, For example, the communication topology is carried out with "N−1" index numbers where a sensor with index number "3" communicates with an adjacent sensor with index number "2", that in turn communicates with the hub having index number "1".

In some embodiments, sensors 202 with highest communication signal quality or strength are assigned the lowest index number 211, since they are in direct communication range. For example, sensor B indicated 202' and sensor C indicated 202" may be assigned index number "i=2" if they both have similar signal strength for communication with the hub 201, while another sensor N indicated 202''' may be assigned a different index number "i=3" if the signal strength is low for communication with the hub 201 such that sensor N indicated 202''' is not within the direct communication range. Thus, sensor N indicated 202''', and assigned index number "i=3", may communicate with another sensor 202 having a lower index number "i=2" so that that sensor 202 may in turn communicate with the hub 201 having the index number "i=1". For example, if the sensor 202 assigns itself an index number "N>2" then that sensor 202 cannot directly communicate with the hub 201, since only sensors 202 assigned having the index number "i=2" may directly communicate with the hub 201 having the index number "i=1".

In some embodiments, a sensor 202 that cannot pass information to an adjacent sensor 202 (e.g., the adjacent sensor 202 having a higher index number 211) may attempt to communicate with another adjacent sensor 202 until the communication is successful such that the information reaches the hub 201. In some embodiments, each sensor 202 may initially be assigned a default index number 211 in order to identify adjacent sensors 202 having a lower index number 211 for communication. Once the sensor 202 assigned the default index number 211 identifies at least one sensor with a lower index number "N", the sensor 202 with the default index number 211 may assign itself an index number "N+1" for communication with the at least one sensor with a lower index number "N". In some embodiments, in case that a particular sensor 202 is unavailable to pass information to the hub 201, then an adjacent sensor 202 may be used.

Once all sensors 202 have been assigned index numbers 211, communication within the computer network 210 (e.g., a mesh IoT network) may be carried out, such that the sensors 202 communicate with the hub 201 in a communication order that is determined based on the assigned index numbers 211.

Accordingly, instead of all sensors communicating with broadcast type communication where the information is distributed to all members of the computer network 210, the communication system 200 allows shortest path communication so that the sensors consume minimal battery power for communication with the hub 201.

For example, IoT sensor B indicated 202' needs to share information with the hub 201, via BLE. The shortest path may be to send the information to sensor N indicated 202''' and from there to the hub 201, so that there is no need for sensor B indicated 202' to consume a lot of battery power for long distance wireless communication.

In some embodiments, a sensor 202 (or IoT device) has information to report to the hub 201, that sensor 202 may identify index numbers 211 of adjacent sensors 202, for instance identify based on a received RSSI list, and initiate communication with sensors having the lowest index number in order to assure better quality of communication and accordingly minimize the required power for communication until the information reaches the hub 201. In some embodiments, when a sensor 202 cannot identify an adjacent sensor having a lower index number 211, that sensor 202 may reassign itself a higher index number until an adjacent sensor is found.

Figure 2B:
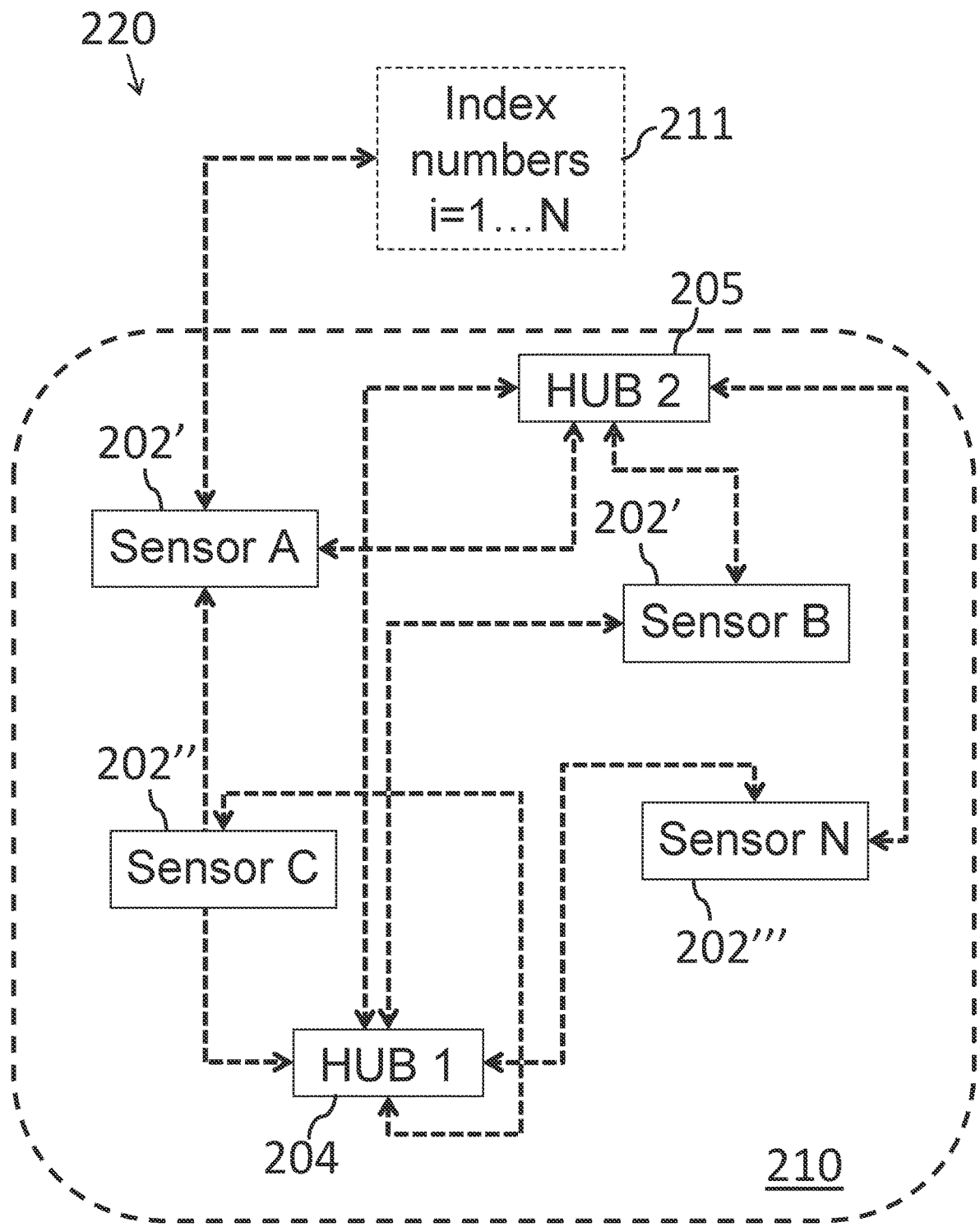
FIG. 2B shows a block diagram of a configuration of the communication system, according to some embodiments of the invention.

Reference is now made to FIG. 2B, which shows a block diagram of a configuration of communication system 220, according to some embodiments of the invention. In FIG. 2B, at least some elements are similar to corresponding elements of FIG. 2A, for example the sensors 202.

The communication system 220 includes a first hub 204, a second hub 205, and a sensor A 202, a sensor B 202', a sensor C 202' and a sensor N 202''', generally sensors 202. The first hub 204 can be coupled to and in communication with sensor A 202, sensor B 202', sensor C 202'', and sensor N 202'''. The second hub 205 can be coupled to and in communication with sensor A 202, sensor B 202', sensor C 202'', and sensor N 202'''. The coupling and/or communication can be wired or wireless.

In some embodiments, each of the first hub 204 and/or second hub 205 may communicate with a limited number (e.g., 1000) of sensors 202 such that each sensor 202 in the computer network 210 may communicate with one of the first hub 204 and/or second hub 205.

The first hub 204 and/or second hub 205 may be a hub and/or a switch and/or a router configured to receive communications from the sensors 202, coupled thereto, and transfer the received data, for instance transfer data to an external server.

In some embodiments, the first hub 204 and/or second hub 205 may serve as a backup for each other.

In some embodiments, the communication in communication system 220 is carried out via the BLE protocol in order to reduce the required amount of power to facilitate the communication. For example, sensors 202 of the computer network 210 may be mobile IoT sensors, where each IoT sensor is powered by a battery. The IoT sensors can be distributed in a field such that communication is required between the sensors in order to cover the entire field when some sensors cannot directly communicate with the hub 201 (e.g., due to a large distance.

In some embodiments, each sensor 202 includes a renewable energy power facility (e.g., a dedicated solar panel) and/or is connected to a wired power source.

In some embodiments, the sensors 202 communicate with the first hub 204 and/or second hub 205 via BLE for example, in order to reduce power consumption, while the first hub 204 and/or second hub 205 receives all the data and is connected to external servers (e.g., connected to the Internet). In some embodiments, at least one sensor 202 is an IoT sensor. For example, the communication within the computer network 210 may be between drones, or autonomous cars that use intermediate nodes to pass information within the communication system 220.

According to some embodiments, communication within the computer network 210 (e.g., a mesh network) is carried out via the BLE protocol, such that each node of the computer network 210 may be assigned an index number for determination of the communication order. For example, in order to save power, a sensor 202 that is distant from the first hub 204 and/or second hub 205 may pass the information to an adjacent sensor 202 that in turn may pass the information to the first hub 204 and/or second hub 205 such that long range communication can be avoided with minimal power consumption.

According to some embodiments, each sensor 202 assigns itself an index number i=1, 2, 3 . . . N based on signal quality or strength of communication with the first hub 204 and/or second hub 205, or any combination thereof. For example, the index number 211 may be assigned based on Received Signal Strength Indicator (RSSI) data for each sensor 202. In some embodiments, each sensor 202 assigns an index number for itself based on signal quality for communication with adjacent sensors 202.

In some embodiments, each sensor 202 receives an RSSI list with substantially all signal attributes of adjacent sensors 202, such that each sensor 202 assigns itself an index number in accordance with the communication signal strength of the adjacent sensors 202.

The first hub 204 and/or second hub 205 may be assigned a default index number "i=1", and adjacent sensors 202 with highest signal quality for communication with the first hub 204 and/or second hub 205, may be assigned index number "i+1=2", such that each element of the computer network 210 communicates with another element having a lower index number 211.

In these examples, the shortest path to communication between the sensors 202 and the first hub 204 and/or second hub 205, for example the path being shortest in distance and/or having lowest number of intermediate nodes during communication may be calculated based on the assigned index numbers 211.

In some embodiments, the communication topology (or order) is determined based on the assigned index numbers 211. For example, the communication topology is carried out with "N−1" index numbers where a sensor with index number "3" communicates with an adjacent sensor with index number "2", that in turn communicates with the first/second hub having index number "1".

In some embodiments, sensors 202 with highest communication signal quality or strength are assigned the lowest index number 211.

For example, sensor B indicated 202' and sensor C indicated 202" may be assigned index number "i=2" if both sensor B and sensor C have similar signal strength for communication with the first hub 204, while another sensor N indicated 202''' that is located further away may be assigned a index number "i=2" if the signal strength is high for communication with the second hub 205.

In some embodiments, once all sensors 202 have been assigned index numbers 211, communication within the computer network 210 (e.g., a mesh IoT network) may be carried out, such that the sensors 202 communicate with the first hub 204 and/or second hub 205 in a communication order that is determined based on the assigned index numbers 211.

In some embodiments, instead of all sensors communicating with broadcast type communication where the information is distributed to all members of the computer network 210, the communication system 200 allows shortest path communication so that the sensors consume minimal battery power for communication with the first hub 204 and/or second hub 205.

For example, IoT sensor B indicated 202' needs to share information with the first hub 204 and/or second hub 205, via BLE. The shortest path may be to send the information to sensor N indicated 202''' and from there to the first hub 204 and/or second hub 205, so that there is no need for sensor B indicated 202' to consume a lot of battery power for long distance wireless communication.

In some embodiments, a sensor 202 (or IoT device) that has information to report to the first hub 204 and/or second hub 205, that sensor 202 may identify index numbers 211 of adjacent sensors 202, for instance identify based on a received RSSI list, and initiate communication with sensors having the lowest index number in order to assure better quality of communication and accordingly minimize the required power for communication until the information reaches the first hub 204 and/or second hub 205.

In some embodiments, a sensor 202 (or IoT device) that does not identify an adjacent sensor 202 having a lower index number, for instance due to a malfunction of one adjacent sensor 202, may assign itself a higher index number 211 so as to communicate with other sensors 202 since communication is allowed with network elements or nodes having a lower index number 211.

According to some embodiments, in case that the first hub 204 is malfunctioning and no longer available for communication, the adjacent sensors to the first hub 204 may reassign their index numbers 211 such that communication passes to the second hub 205 and accordingly all sensors adjacent to the first hub 201 (having low index numbers) and far away from the second hub 205 may reassign their index numbers to be the highest in the computer network 210.

Accordingly, such communication systems may allow setting up a large scale computer network 210 (e.g., an IoT mesh network) with minimal power consumption based on passive operation of the sensors. In some embodiments, the sensors are not registered to advertised nodes so that there is no external factor in calculating the shortest path such that power consumption is minimized.

Figure 3:
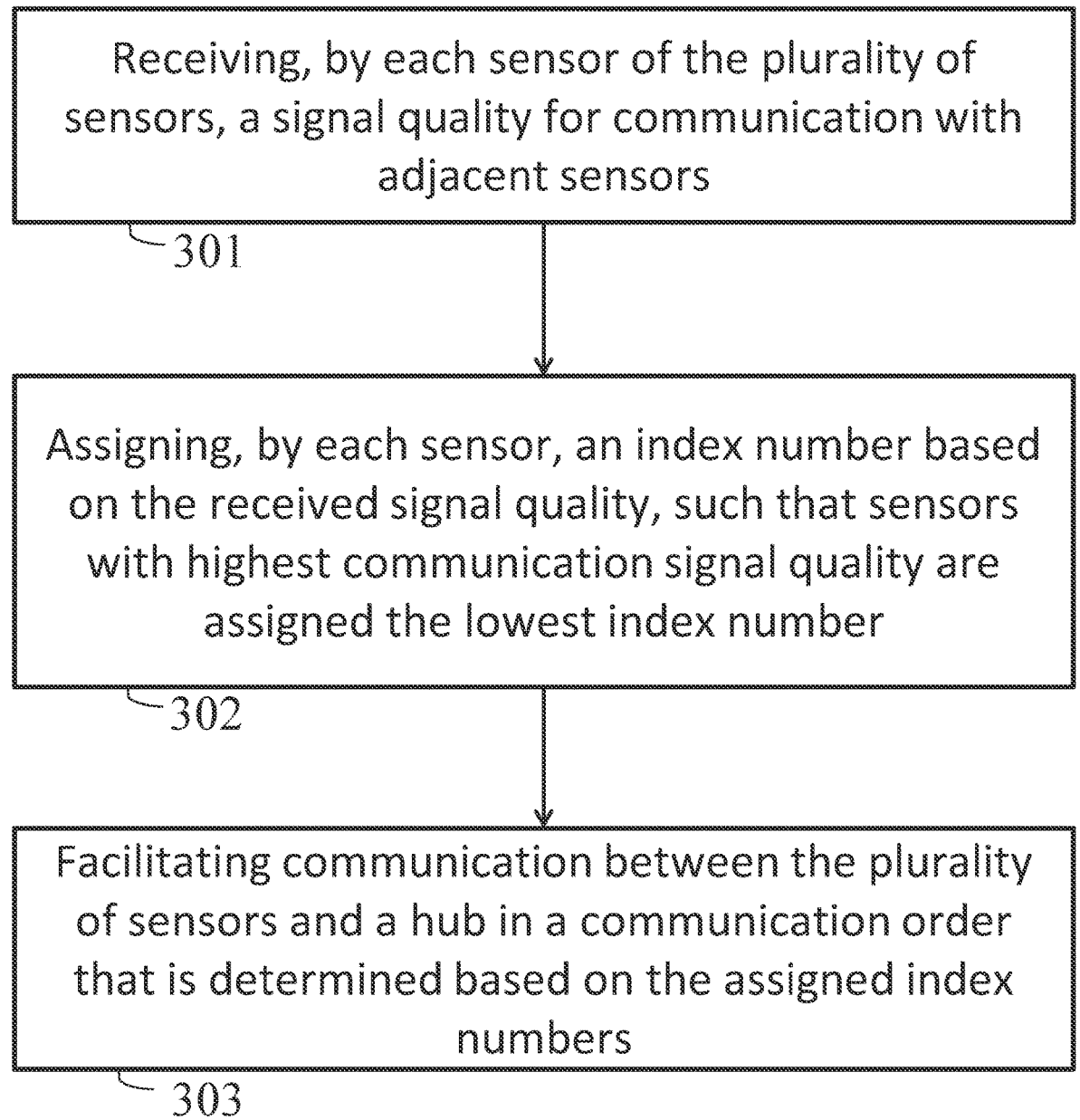
FIG. 3 shows a flowchart of a method of communication for a plurality of sensors, according to some embodiments of the invention.

Reference is now made to FIG. 3, which shows a flowchart of a method of communication for a plurality of sensors, according to some embodiments of the invention.

In Step 301, a signal quality is received (e.g., by each sensor 202, as described above in FIGS. 2A-2B) for communication with adjacent sensors.

In Step 302, an index number is assigned (e.g., by each sensor 202, as described above in FIGS. 2A-2B) based on the received signal quality, such that sensors with highest communication signal quality are assigned the lowest index number.

In Step 303, communication is facilitated (e.g., by each sensor 202, as described above in FIGS. 2A-2B) between the sensors and the hub in a communication order that is determined based on the assigned index numbers, where the hub communicates with each of the sensors.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:
1. A communication system, the system comprising:
a first hub;
a second hub, wherein the second hub is configured to be a backup for the first hub; and
a plurality of sensors, wherein each sensor is configured to transmit communications to each of the first hub and the second hub,
wherein each sensor is configured to assign itself an index number based on signal quality of communication with adjacent sensors, such that sensors with highest communication signal quality with the adjacent sensors are assigned the lowest index number,
wherein communication is facilitated in a communication order that is determined based on the assigned index numbers, and
wherein each sensor is assigned an index number such that the shortest path to communication with the first hub is achieved.

2. The communication system of claim 1, wherein the communication between sensors is carried out via Bluetooth.

3. The communication system of claim 1, wherein the shortest path has lowest number of intermediate nodes during communication.

4. The communication system of claim 1, wherein at least one sensor is an Internet of Things (IOT) sensor.

5. A method of communication for a plurality of sensors, the method comprising:
- receiving, by each sensor of the plurality of sensors, a signal quality for communication with adjacent sensors;
- assigning, by each sensor, an index number based on the received signal quality, such that sensors with highest communication signal quality are assigned the lowest index number; and
- facilitating communication between the plurality of sensors and two hubs in a communication order that is determined based on the assigned index numbers, wherein one of the hubs is configured to be a backup for the other hub,
- wherein each hub of the two hubs is configured to receive communications from each of the sensors, and wherein each sensor is assigned an index number such that the shortest path to communication with one of the two hubs is achieved.

6. The method of claim 5, wherein the shortest path has lowest number of intermediate nodes during communication.

7. The method of claim 5, wherein the communication between sensors is carried out via Bluetooth.

8. The method of claim 5, wherein at least one sensor is an Internet of Things (IOT) sensor.

9. A communication system for communication between a plurality of Internet of Things (IOT) devices, the system comprising:
- a first hub;
- a second hub, wherein the second hub is configured to be a backup for the first hub;
- a plurality of IoT devices, wherein each IoT device is configured to transmit communications to each of the first hub and the second hub,
- wherein each IoT device is configured to assign itself an index number based on signal quality of communication with adjacent IoT devices, such that IoT devices with highest communication signal quality are assigned the lowest index number, and
- wherein communication is facilitated in a communication order that is determined based on the assigned index numbers, and wherein each IoT device is assigned an index number such that the shortest path to communication with the first hub is achieved.

10. The communication system of claim 9, wherein the communication between IoT devices is carried out via Bluetooth.

11. The communication system of claim 9, wherein the shortest path has lowest number of intermediate nodes during communication.

* * * * *